US009421961B2

(12) United States Patent
Schreiter

(10) Patent No.: US 9,421,961 B2
(45) Date of Patent: Aug. 23, 2016

(54) METHOD FOR DETERMINING A BRAKE PRESSURE VALUE ON THE BASIS OF CHARACTERISTIC CURVES

(71) Applicant: Markus Schreiter, Gundelsheim (DE)

(72) Inventor: Markus Schreiter, Gundelsheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/378,940

(22) PCT Filed: Feb. 14, 2013

(86) PCT No.: PCT/EP2013/052926
§ 371 (c)(1),
(2) Date: Aug. 14, 2014

(87) PCT Pub. No.: WO2013/120928
PCT Pub. Date: Aug. 22, 2013

(65) Prior Publication Data
US 2015/0046056 A1   Feb. 12, 2015

(30) Foreign Application Priority Data
Feb. 16, 2012   (DE) .......................... 10 2012 003 106

(51) Int. Cl.
*B60T 8/172*   (2006.01)
*B60T 17/22*   (2006.01)
(Continued)

(52) U.S. Cl.
CPC .................. *B60T 17/22* (2013.01); *B60T 7/042* (2013.01); *B60T 8/17* (2013.01); *B60T 8/172* (2013.01);
(Continued)

(58) Field of Classification Search
CPC ................ B60T 8/172; B60T 2270/14; B60T 2270/204; B60T 2270/308; B60T 7/042; B60T 8/3255; B60T 8/326; B60T 8/3265; B60T 8/327; B60T 8/3275

USPC ............................................................ 701/78
See application file for complete search history.

(56) References Cited

U.S. PATENT DOCUMENTS 3,802,745 A * 4/1974 Strifler et al. ..................... 303/3
5,011,236 A * 4/1991 Toepfer et al. ............... 303/198
(Continued)

FOREIGN PATENT DOCUMENTS

CN      2631877         8/2004
CN      101263034       9/2008
(Continued)

OTHER PUBLICATIONS

FMCSA Regulation, 49 CFR 393.55 (Antilock brake systems), as amended on Sep. 21, 2010.*
(Continued)

*Primary Examiner* — Behrang Badii
*Assistant Examiner* — David Testardi
(74) *Attorney, Agent, or Firm* — Kenyon & Kenyon LLP

(57) ABSTRACT

A method for determining a value of a brake pressure modulated by a pneumatic channel of a braking value encoder having at least one electrical channel, in a braking device of a vehicle, including: (a) a first characteristic curve, in which the dependence of the signals, modulated by the at least one electrical sensor, on the degree of activation of the braking value encoder is represented, is determined and stored; (b) a second characteristic curve, in which the dependence of the brake pressure values, modulated by the channel, on the electrical signals detected by the sensor is represented, is determined and stored; and (c) the brake pressure value corresponding to a specific braking request as a result of activation of the encoder is determined based on the first and second characteristic curves.

12 Claims, 3 Drawing Sheets

(51) Int. Cl.
*B60T 7/04* (2006.01)
*B60T 13/66* (2006.01)
*B60T 8/32* (2006.01)
*B60T 8/36* (2006.01)
*B60T 8/17* (2006.01)
*B60T 8/176* (2006.01)

(52) U.S. Cl.
CPC ............... *B60T 8/176* (2013.01); *B60T 8/327* (2013.01); *B60T 8/36* (2013.01); *B60T 13/662* (2013.01); *B60T 2270/14* (2013.01)

(56) References Cited

U.S. PATENT DOCUMENTS

| | | | | |
|---|---|---|---|---|
| 5,163,742 | A * | 11/1992 | Topfer et al. | 303/155 |
| 5,419,621 | A * | 5/1995 | Horst | 303/15 |
| 5,575,543 | A * | 11/1996 | Pheonix | 303/155 |
| 5,967,624 | A * | 10/1999 | Graber et al. | 303/113.4 |
| 6,203,115 | B1 | 3/2001 | Rosendahl et al. | 303/3 |
| 6,354,671 | B1 * | 3/2002 | Feldmann | B60T 7/042 303/15 |
| 6,367,889 | B1 * | 4/2002 | Tsubouchi et al. | 303/113.4 |
| 6,408,712 | B1 * | 6/2002 | Bolisetty et al. | 74/514 |
| 2004/0155523 | A1 * | 8/2004 | Frentz et al. | 303/155 |
| 2004/0187625 | A1 * | 9/2004 | Schiel et al. | 74/514 |
| 2005/0131613 | A1 | 6/2005 | Bohm et al. | |
| 2005/0173980 | A1 | 8/2005 | Bohm et al. | |
| 2011/0125381 | A1 * | 5/2011 | Szell et al. | 701/70 |

FOREIGN PATENT DOCUMENTS

| | | | |
|---|---|---|---|
| CN | 101370696 | | 2/2009 |
| DE | 19501286 | | 7/1996 |
| DE | 19504411 | | 8/1996 |
| DE | 196 20 540 | | 1/1998 |
| DE | 196 53 264 | | 6/1998 |
| DE | 19707207 | | 8/1998 |
| DE | 199 31 865 | | 1/2001 |
| DE | 10 2006 029349 | | 1/2008 |
| DE | 102007018515 | | 10/2008 |
| DE | 102008022026 | | 11/2009 |
| DE | 10 2008 029311 | | 12/2009 |
| EP | 0 241 673 | | 10/1987 |
| EP | 373315 | | 6/1990 |
| EP | 399162 | | 11/1990 |
| EP | 0 447 750 | | 9/1991 |
| EP | 814981 | | 1/1998 |
| EP | 949130 | | 10/1999 |
| EP | 1 000 830 | | 5/2000 |
| EP | 1069015 | | 1/2001 |
| EP | 1275570 | | 1/2003 |
| EP | 1404557 | | 4/2004 |
| EP | 2040961 | | 4/2009 |
| GB | 2419164 A * | | 4/2006 |
| JP | 2002145044 A * | | 5/2002 ............ B60T 13/52 |
| WO | 95/16594 | | 6/1995 |

OTHER PUBLICATIONS

Textbook for Motor Vehicle Technicians "Brake Systems", Vogel Book Publishers, 2004, pp. 219-233.

European Patent Office, International Preliminary Report on Patentability dated Aug. 19, 2014, from International Patent Application No. PCT/EP2013/052926, filed on Feb. 14, 2013.

English Translation of European Patent Office, International Preliminary Report on Patentability dated Aug. 19, 2014, from International Patent Application No. PCT/EP2013/052926, filed on Feb. 14, 2013.

* cited by examiner

US 9,421,961 B2

METHOD FOR DETERMINING A BRAKE PRESSURE VALUE ON THE BASIS OF CHARACTERISTIC CURVES

FIELD OF THE INVENTION

The present invention relates to a method for determining the brake pressure value of the brake pressure which is modulated by a pneumatic channel of a braking value encoder further having at least one electrical channel, in a brake system of a motor vehicle without using a brake pressure sensor, wherein electrical signals which represent brake pressure values which are desired as a function of activations of the braking value encoder are generated by at least one electrical sensor which is assigned to the electrical channel, and to a braking device of a vehicle in which a brake pressure value which is determined according to the method is used.

BACKGROUND INFORMATION

German patent document DE 198 52 399 A1 discusses a braking value encoder, which can be activated by a foot-operated brake pedal, for an electronic brake system, which braking value encoder generates a pneumatic brake pressure in a pneumatic channel as a function of the activation, and an electrical braking request signal in an electrical channel via an electrical sensor. In the event of electrics or electronics failure, the pneumatic brake pressure which is generated in the pneumatic channel by the braking value encoder becomes effective as the brake pressure.

As discussed in DE 10 2006 029 349 A1, the closed-loop control arrangement for a brake system with an ABS functionality contains a wheel pressure closed-loop controller which is controlled by a superordinate function which calculates the pressure requirements. The wheel pressure closed-loop controller then sets the desired wheel pressure. The control quality of an ABS closed-loop control arrangement depends here substantially on the closed-loop control accuracy of the wheel pressure closed-loop controller. If the pressure requirements are implemented imprecisely, the ABS closed-loop control arrangement cannot keep the respective wheel in the optimum slip range. As a result, adverse effects incur on the braking power or stability during braking.

Optimum traction control can be achieved if separate pressure sensors are present in each of the wheel brake circuits. However, for the sake of cost-effective fabrication of the brake control system it is often the case that no wheel pressure sensors are present with the result that the current wheel pressure which is necessary for the closed-loop control arrangement has to be determined by a wheel pressure model. However, in order to determine the wheel pressure by the wheel pressure model, at least one item of information about the admission pressure which is present is required in order to be able to infer the current wheel pressure from actuation times of the inlet and outlet valves. Consequently, the wheel pressure controller in which the wheel pressure model is implemented uses the admission pressure measured with an admission pressure sensor at the braking value encoder as an output value for determining the current wheel pressure.

FIG. 1 shows an ABS closed-loop control arrangement for pneumatic or electro-pneumatic brake systems according to the prior art, in which ABS closed-loop control arrangement, when a braking operation is initiated by activating a braking value encoder 6, the wheel rotational speed signals which are supplied by wheel rotational speed sensors 1 are evaluated in a control unit 2 and the respective brake slip of the wheels which are provided with wheel brake cylinders 4 is calculated. The ABS closed-loop control arrangement, which are implemented in the control unit 2, then adjust, via ABS valves 8, the brake slips of the wheels via ABS control valves 8 to an optimum slip control range in order to achieve the shortest possible braking distance and stable vehicle behavior.

On the basis of the limited supply pressure in the reservoir containers and the relatively long pneumatic piping, in particular in utility vehicles, such ABS closed-loop control is possible without information about the admission pressure at the ABS control valve 8, but when the admission pressure information is dispensed with the ABS closed-loop control is imprecise and the braking distance becomes longer and the ABS closed-loop control becomes uncomfortable. The ABS closed-loop control becomes more comfortable and more precise compared to this if a piece of information about the admission pressure such as can be determined using an admission pressure sensors which is arranged upstream of the ABS control valve 8 is present in the ABS system.

This admission pressure sensor 5 measures the admission pressure in a feedline of the ABS control valve 8 which then modulates a brake-slip-optimized brake pressure at the brake cylinder of the assigned wheel 4. The actuation times of the ABS valves 8 can be calculated on the basis of known characteristics of the ABS control valve 8 and the information supplied by the admission pressure sensor 5 by the admission pressure, in order to obtain the respective target pressure at the brake-slip-controlled wheel 4. An admission pressure sensor 5 is therefore understood to be a pressure sensor which measures the brake pressure which is present upstream of an ABS control valve 8 and is therefore connected upstream of the ABS control valve.

However, such ABS admission pressure sensors are associated with certain costs. Furthermore, failure of admission pressure sensors or of the evaluation unit thereof at the same time brings about a failure of the ABS closed-loop control by the ABS control valves.

Furthermore, in the case of an electronically closed-loop controlled breaking device (EBS) in the case of pressure closed-loop control modules (DRM) which are switched off as a function of faults, the ABS closed-loop control arrangement can no longer take place by the ABS valves which are connected downstream of the pressure closed-loop control modules, since the pressure sensors which are integrated in the pressure closed-loop control modules can then no longer supply any information about the ABS admission pressure.

SUMMARY OF THE INVENTION

The present invention is consequently based on the object of providing a method of the type mentioned at the beginning or a braking device of the type mentioned at the beginning in such a way that even without the presence of an admission pressure sensor or even without a functionally capable admission pressure sensor a brake pressure value or admission pressure value which is precise as possible can be determined.

This object may be achieved according to the invention by a method according to the description herein and a breaking device according to the description herein.

The present invention is based on a method in which:
a) a first characteristic curve, in which the dependence of the electrical signals, modulated by the at least one electrical sensor of the electrical channel, on the degree of activation of the braking value encoder is represented, is determined and stored, and
b) a second characteristic curve, in which the dependence of the brake pressure values, modulated by the at least one pneumatic channel, on the electrical signals detected by the electrical sensor is represented, is determined and stored, wherein c) the brake pressure value which corresponds to a specific braking request as a result of activation of the braking value encoder is determined on the basis of the first characteristic curve and the second characteristic curve.

The present invention also relates to a breaking device of a vehicle having a braking value encoder, containing at least one electrical channel with at least one electrical sensor and at least one pneumatic channel, in which a brake pressure value which is determined according to the above method is used, in particular as an admission pressure value for an ABS closed-loop control arrangement of the braking device. The braking device is, in particular, an electronically closed-loop control brake system (EBS) with one channel or two channel pressure closed-loop control modules. In the event of a failure of the pressure sensor which is integrated into a pressure closed-loop control module of the EBS the ABS admission pressure for the ABS control valve or valves arranged downstream of the pressure closed-loop control modules can then also be determined.

In other words, the function of an admission pressure sensor is modeled by a variable which is already present in the braking device, such as the electrical signal of the electrical channel which is dependent on the degree of activation of the braking valve encoder, in that the brake pressure value which corresponds to a specific activation of the braking value encoder is determined on the basis of calibration of the braking value encoder. The braking value encoder is therefore calibrated with respect to its electric and pneumatic output signals using the method, wherein this calibration can be performed in advance at the manufacturer's of the braking value encoder, for example by characteristic diagrams in which the first and second characteristic curves are represented.

The admission pressure sensor can then advantageously be omitted from the braking device, which is particularly cost-effective. A failure of an admission pressure sensor which is present in a braking device also has no negative effects on the braking device, in particular not on the ABS closed-loop control arrangement thereof because the ABS admission pressure value is determined in parallel on the basis of the two characteristic curves. In particular, in the case of an electronic brake pressure closed-loop control system (EBS) the invention continues to permit ABS closed-loop control even in the case of disruptive or switched-off pressure closed-loop control modules, using the ABS valves connected downstream of the pressure closed-loop control modules. The method according to the invention or a braking device in which a brake pressure value which is determined according to this method is used can therefore also be used in parallel with an existing or functionally capable pressure sensor as redundancy for the determination of the brake pressure values which the pneumatic channel of the braking value encoder modulates as a function of activation.

The measures specified in the further description herein permit advantageous developments and improvements of the present invention disclosed herein.

According to one particular embodiment of the method, the second characteristic curve is also determined as a function of the respectively present supply pressure from which the brake pressure in the braking value encoder is derived. This is because the braking value encoder, here for example an electronic foot-operated brake module, is as a rule supplied by a supply pressure of a pressure reservoir with pneumatic supply pressure from which the pneumatic brake pressure or control pressure in the pneumatic channel of the braking value encoder acting as a service brake valve there is then derived as a function of activation. In this context, the level of the supply pressure which is respectively present plays a role in the formation of the brake pressure or control pressure. For example, the value of the respectively present supply pressure is read out of a signal which is conducted in a vehicle databus and which is applied to the vehicle databus by a supply pressure sensor.

According to one development of the method according to the invention, the first characteristic curve and/or the second characteristic curve are also determined or adapted as a function of aging-induced and/or wear-induced parameters such as the number of activations of the foot-operated brake module which have already taken place. Aging-induced factors can then be included in the characteristic curves, in particular statistically. As a result, this allows for the fact that the first and second characteristic curves can change as a function of the aging.

As already mentioned above, the brake pressure value which is determined on the basis of the characteristic curves can then be used for a closed-loop control arrangement, in particular for an ABS closed-loop control arrangement of a braking device, as an ABS admission pressure value, i.e. as a pressure value such as is present at the inlet of the respective ABS control valve.

The one brake pressure value, determined for a brake circuit, may particularly be used to determine another brake pressure value in a further brake circuit, wherein the other brake pressure value is determined from the one brake pressure value by a functional dependence. This functional dependence can comprise, in particular, a factor through which the two brake pressure values differ. In this context, the one brake circuit can be, for example, a front-axle brake circuit and the other brake circuit can be a rear-axle brake circuit, or there are diagonal brake circuits present.

This functional dependence can be stored in turn on the basis of a brake circuit characteristic curve and may have been determined by tests.

According to a particular embodiment of the breaking device, the first characteristic curve and/or the second characteristic curve and/or the brake circuit characteristic curve are stored in a memory of a control unit. In this context, the control unit can be integrated into the braking value encoder and/or is formed by a brake control unit of the braking device.

The braking value encoder may particularly be formed by a combined electrical and pneumatic foot-operated brake module.

Further measures which improve the invention are illustrated in more detail below together with the description of exemplary embodiments of the invention with reference to the drawings.

DETAILED DESCRIPTION

Figure 2:
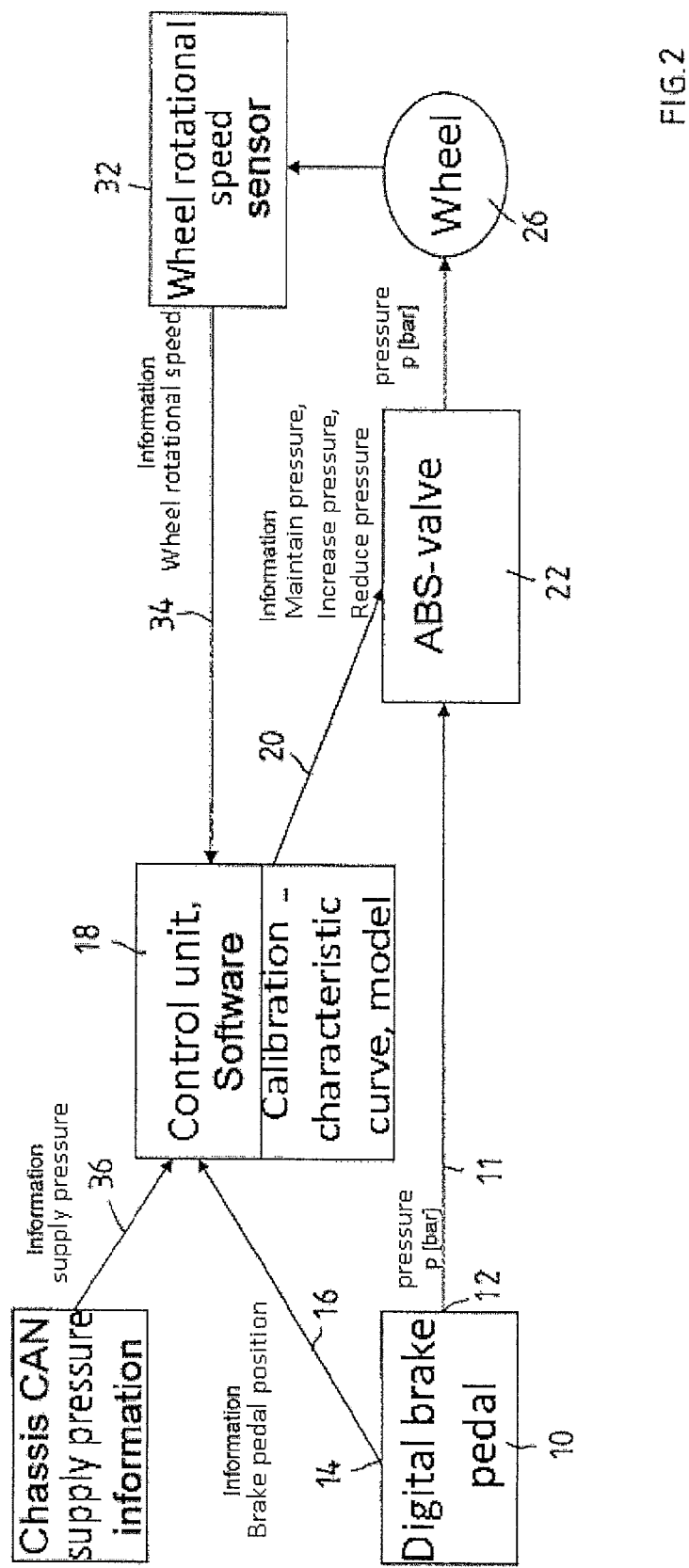
FIG. 2 shows a schematic circuit diagram of an exemplary embodiment of a braking device in which the admission pressure for the ABS closed-loop control arrangement is determined without a pressure sensor, but also according to the method in accordance with the invention.

Part of a electro-pneumatic brake system of a utility vehicle is illustrated in FIG. 2 and has an electro-pneumatic braking value encoder 10, for example an electronic foot-operated brake module with at least one pneumatic channel 12 via which brake pressure values can be applied to a pneumatic brake circuit of the braking device, which brake pressure values are formed as a function of the degree of activation of a foot-operated brake pedal of the foot-operated brake module 10. For this purpose, the pneumatic channel 12 of the foot-operated brake module 10 includes, for example, a service brake valve (not shown explicitly here) which generates pneumatic control pressures or brake pressures as a function of the activation of a foot-operated brake pedal of the foot-operated brake module and applies them to a pneumatic line 11 which connects the pneumatic channel 12 to an ABS control valve 22.

Furthermore, the foot-operated brake module 10 has at least one electrical channel 14 via which an electrical control signal can be applied to an electric brake circuit, which electrical signal represents the brake pressure value which corresponds to the respective braking request or the respective activation of the foot-operated brake pedal, and which is generated, for example, by an electrical potentiometer which modulates a specific current I as a function of an activation angle $\phi$ of the foot-operated brake pedal. Therefore, electrical control signals representing brake pressures of the pneumatic channel 12 are generated in the electrical channel 14 of the foot-operated brake model in accordance with the actuation of the foot-operated brake pedal. An electronic brake control unit 18 (explained later) can also be integrated into the foot-operated brake module. Such a foot-operated brake module 10 is believed to be sufficiently understood, for example from DE 198 52 399 A1 mentioned at the beginning.

The electrical control signals generated by the electrical channel 14 are fed for evaluation to the electronic brake control unit 18 via a signal line 16, and are then applied as control signals to an electro-pneumatic control valve device (not shown here) such as a pressure closed-loop control module in order to generate a specific brake pressure in brake actuators or brake cylinders of the braking device. The braking device can be, in particular, an electronically closed-loop control braking device with brake pressure closed-loop control. In the event of a failure of the electric brake circuit, a brake pressure can then still be generated using the pneumatic brake circuit.

An ABS closed-loop control logic is implemented in the electronic brake control unit 18, which ABS closed-loop control logic actuates an ABS control valve 22 via a further signal line 20 so that the latter modulates, if appropriate through maintaining, increasing or reducing pressure from the control pressure or brake pressure present in the pneumatic channel 12, a brake pressure which is adapted with respect to an optimum brake slip. This brake pressure is then applied to a wheel brake cylinder 26 downstream of the ABS control valve 22 via a pneumatic line 24. A wheel rotational speed sensor 32 measures the wheel rotational speed and transmits it via a signal line 34 to the brake control unit 18 which places this in relationship with a vehicle speed in a known manner in order to detect the actual brake slip of the respective wheel. If the actual brake slip differs from an optimum setpoint brake slip range, the ABS control valve is actuated in order to adapt the actual brake slip.

The knowledge of the brake pressure value which is present in the pneumatic channel 12 and is in accordance with the respective braking request is beneficial for the ABS closed-loop control. In order to determine this brake pressure value, a method is proposed in which a first characteristic curve 28 according to FIG. 3, in which the dependence of the electrical signals, modulated by the electrical channel 14, on the degree of activation of the foot-operated brake module 10 is illustrated, is determined and stored, and a second characteristic curve 30, in which the dependence of the brake pressure values, modulated by the pneumatic channel 12, on the electrical signals of the electrical channel 14 is illustrated, is determined and stored, wherein the brake pressure value which corresponds to the braking request by activation of the foot-operated brake module 10 is determined on the basis of the first characteristic curve 28 and second characteristic curve 30.

Figure 1:
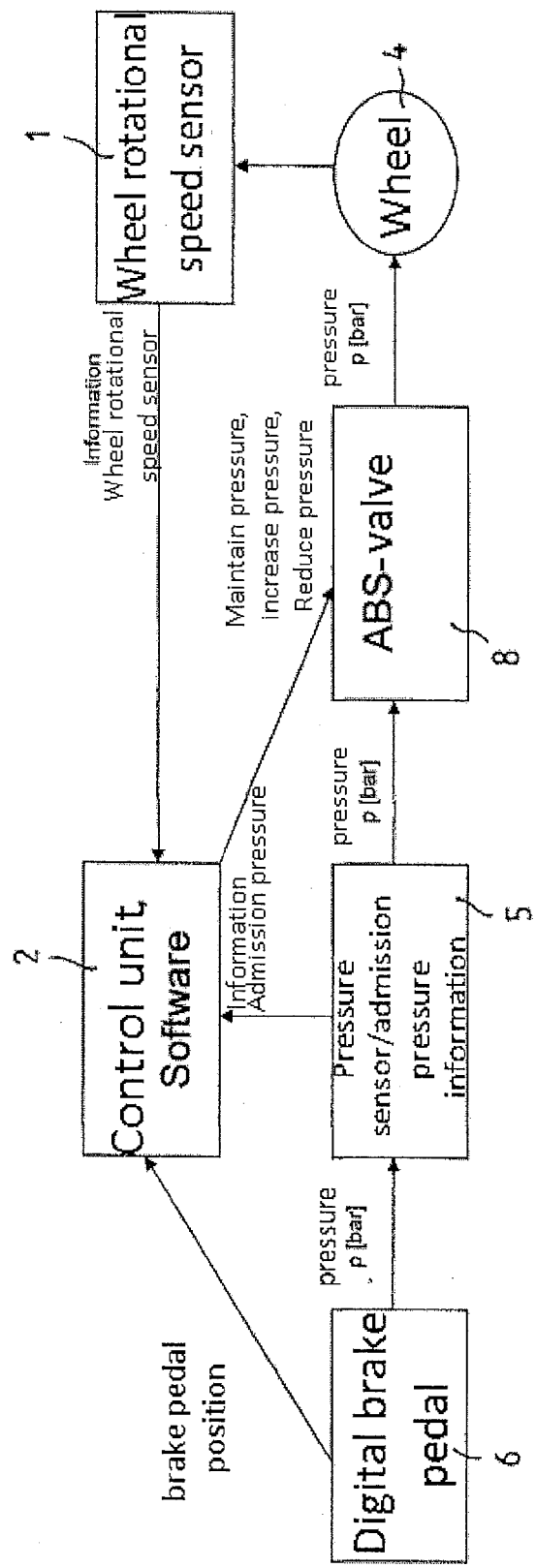
FIG. 1 shows a schematic circuit diagram of a braking device according to the prior art, in which braking device a pressure sensor is used to determine the admission pressure in an ABS closed-loop control arrangement.

Then, it is possible to dispense with the pressure sensor 5 according to the prior art in accordance with FIG. 1. In particular, therefore provided, for example, by tests, are the first characteristic curve 28 according to FIG. 3 and the second characteristic curve 30 according to FIG. 4. The second characteristic curve according to FIG. 4 particularly may also be determined as a function of the supply pressure which is respectively present at the input terminal for the pneumatic channel 12 of the foot-operated brake module 10.

The first characteristic curve 28 and/or the second characteristic curve 30 and/or the brake circuit characteristic curve may particularly be stored in a memory of the brake control unit 18 of the braking device.

Figure 3:
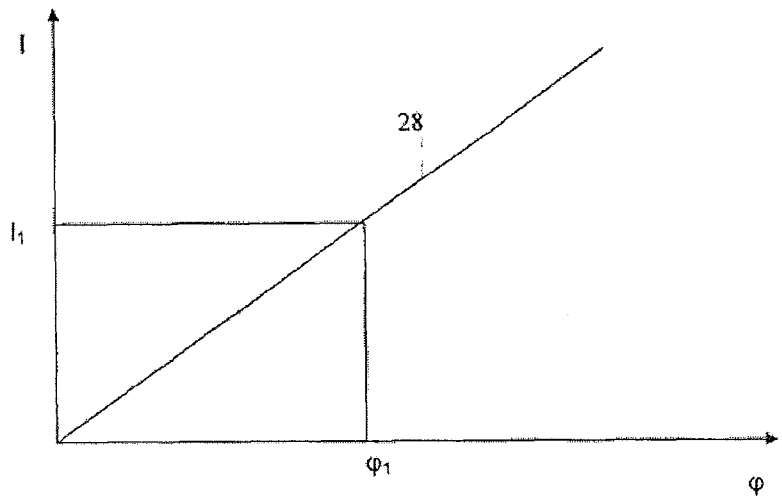
FIG. 3 shows a first characteristic curve such as is used in the method according to the invention.

In the case of an activation angle $\phi_1$ of the foot-operated brake pedal of the foot-operated brake module 10, a current $I_1$ is generated, for example, as an electrical control signal in the electrical channel 14, as is shown by the first characteristic curve 28 in FIG. 3. This control signal $I_1$ then corresponds, according to the second characteristic curve 30 illustrated in FIG. 4, to a brake pressure value $p_1$ in the case of a specific supply pressure. This brake pressure value $p_1$ is then used as an admission pressure value for the ABS control valve 22 in the ABS closed-loop control arrangement of the braking device.

Figure 4:
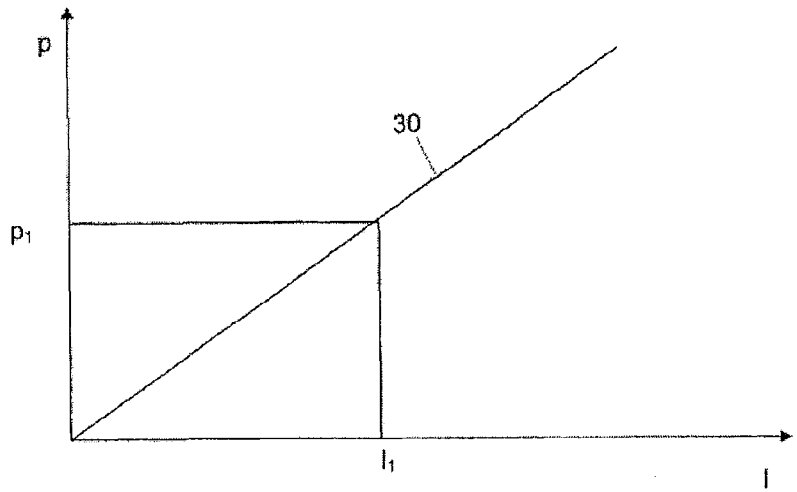
FIG. 4 shows a second characteristic curve such as is used in the method according to the invention.

Since this brake pressure value $p_1$ can depend not only on the degree of activation or activation angle $\phi_1$ of the foot-operated brake pedal of the foot-operated brake module but also on the in each case at the pneumatic input of the pneumatic duct 12 of the foot-operated brake module, the profile of the second characteristic curve 30 according to FIG. 4 also depends on the respective value of the supply pressure. Consequently, FIG. 4 can contain a separate characteristic curve 30 for each supply pressure value. The respective value of the supply pressure can be extracted from a signal which is conducted in a vehicle databus (CAN) 36 and which is applied to the vehicle databus, for example by a supply pressure sensor.

According to one development of the method according to the invention, the first characteristic curve 28 according to FIG. 3 and/or the second characteristic curve 30 according to FIG. 4 is/are also determined or adapted as a function of the aging-induced and/or wear-induced parameters such as the number of activations of the foot-operated brake module 10 which have already taken place. This allows for the fact that the first and/or second characteristic curves 28, 30 can change due to wear and aging of the foot-operated brake module 10.

FIG. 2 illustrates the braking device with just one pneumatic channel 12 or brake circuit and an electrical channel or brake circuit 14. However, there can also be a plurality of brake circuits present in each case. The brake pressure value, determined for a pneumatic brake circuit using the method presented above, may particularly then be used to determine another brake pressure value in a further pneumatic brake circuit, wherein the other brake pressure value is determined from the one brake pressure value by a functional dependence. This functional dependence can consist, in particular, in a factor by which the two brake pressure values differ. This functional dependence can be stored, for example, in a further characteristic diagram or a brake circuit characteristic curve. In this context, the one brake circuit can be, for example, a front-axle brake circuit and the other brake circuit can be a rear-axle brake circuit, or there are diagonal brake circuits present.

The List of Reference Numerals is as Follows:
1 Wheel rotational speed sensor
2 Control unit
4 Wheel brake cylinder
5 Admission pressure sensor
6 Braking value encoder
8 ABS control valve
10 Braking value encoder
11 Pneumatic line
12 Pneumatic channel
14 Electrical channel
16 Signal line
18 Brake control unit
20 Signal line
22 ABS control valve
24 Pneumatic line
26 Wheel brake cylinder
28 First characteristic curve
30 Second characteristic curve
32 Wheel rotational speed sensor
34 Signal line
36 Vehicle databus

The invention claimed is:

1. A method for determining a brake pressure value of a brake pressure which is modulated by a pneumatic channel of a braking value encoder further having at least one electrical channel, in a braking device of a motor vehicle without using a brake pressure sensor, in which electrical signals which represent brake pressure values which are desired as a function of activations of the braking value encoder are generated by at least one electrical sensor which is assigned to the electrical channel, the method comprising:
   storing, via a control unit, a first characteristic curve, in which the electrical signals, modulated by the at least one electrical sensor of the electrical channel, depend on the degree of activation of the braking value encoder;
   storing, via the control unit, a second characteristic curve, in which the brake pressure values, modulated by the at least one pneumatic channel, depend on electrical signals detected by the electrical sensor; and
   determining, via the control unit, the brake pressure value which corresponds to a specific braking request as a result of activation of the braking value encoder based on the first characteristic curve and the second characteristic curve;
   wherein the braking value encoder includes the at least one electrical sensor which is assigned to the electrical channel,
   wherein the electrical signals generated by the electrical channel are fed to the control unit via a signal line, and corresponding control signals are applied to an electro-pneumatic control valve device to generate a specific brake pressure in brake actuators or brake cylinders of the braking device, and
   wherein the second characteristic curve is also determined as a function of a respectively present supply pressure from which the brake pressure in the pneumatic channel of the braking value encoder is derived.

2. The method of claim 1, wherein the value of the respectively present supply pressure is extracted from a signal which is conducted in a vehicle databus and is applied to the vehicle databus by a supply pressure sensor.

3. The method of claim 1, wherein at least one the first characteristic curve and the second characteristic curve are also determined or adapted as a function of at least one of aging-induced and wear-induced parameters.

4. The method of claim 1, wherein the determined brake pressure values are used in a closed-loop control arrangement.

5. The method of claim 4, wherein the determined brake pressure values are used for an ABS closed-loop control arrangement of a braking device, in which the determined brake pressure value forms an ABS admission pressure value.

6. The method of claim 1, wherein a brake pressure value, determined for a pneumatic brake circuit of the braking device, is used to determine another brake pressure value in a further pneumatic brake circuit, and wherein the other brake pressure value is determined from the one brake pressure value by a functional dependence.

7. The method of claim 1, wherein at least one the first characteristic curve and the second characteristic curve are also determined or adapted as a function of at least one of aging-induced and wear-induced parameters, which include the number of activations of the braking value encoder which have already taken place.

8. A non-transitory computer readable medium having a computer program, which is executable by a processor, comprising:
   a program code arrangement having program code for determining a brake pressure value of a brake pressure which is modulated by a pneumatic channel of a braking value encoder further having at least one electrical channel, in a braking device of a motor vehicle without using a brake pressure sensor, in which electrical signals which represent brake pressure values which are desired as a function of activations of the braking value encoder are generated by at least one electrical sensor which is assigned to the electrical channel, by performing the following:
   storing, via the processor, a first characteristic curve, in which the electrical signals, modulated by the at least one electrical sensor of the electrical channel, depends on the degree of activation of the braking value encoder;
   storing, via the processor, a second characteristic curve, in which the brake pressure values, modulated by the at least one pneumatic channel, depends on electrical signals detected by the electrical sensor; and
   determining, via the processor, the brake pressure value which corresponds to a specific braking request as a result of activation of the braking value encoder based on the first characteristic curve and the second characteristic curve;
   wherein the braking value encoder includes the at least one electrical sensor which is assigned to the electrical channel,
   wherein the electrical signals generated by the electrical channel are fed to the processor via a signal line, and corresponding control signals are applied to an electro-pneumatic control valve device to generate a specific brake pressure in brake actuators or brake cylinders of the braking device, and wherein the second characteristic curve is also determined as a function of a respectively present supply pressure from which the brake pressure in the pneumatic channel of the braking value encoder is derived.

9. A braking device of a vehicle, comprising:

a braking value encoder having a control unit, containing at least one electrical channel which has at least one electrical sensor and at least one pneumatic channel, in which is determined a brake pressure value of a brake pressure which is modulated by a pneumatic channel of a braking value encoder further having at least one electrical channel, in a braking device of a motor vehicle without using a brake pressure sensor, in which electrical signals which represent brake pressure values which are desired as a function of activations of the braking value encoder are generated by at least one electrical sensor which is assigned to the electrical channel, the control unit being configured to perform the following:

storing, via the control unit, a first characteristic curve, in which the electrical signals, modulated by the at least one electrical sensor of the electrical channel, depends on the degree of activation of the braking value encoder;

storing, via the control unit, a second characteristic curve, in which the brake pressure values, modulated by the at least one pneumatic channel, depends on electrical signals detected by the electrical sensor; and determining, via the control unit, the brake pressure value which corresponds to a specific braking request as a result of activation of the braking value encoder based on the first characteristic curve and the second characteristic curve;

wherein the braking value encoder includes the at least one electrical sensor which is assigned to the electrical channel, wherein the electrical signals generated by the electrical channel are fed to the control unit via a signal line, and corresponding control signals are applied to an electro-pneumatic control valve device to generate a specific brake pressure in brake actuators or brake cylinders of the braking device, and wherein the second characteristic curve is also determined as a function of a respectively present supply pressure from which the brake pressure in the pneumatic channel of the braking value encoder is derived.

10. The braking device of claim 9, wherein the first characteristic curve and the second characteristic curve are stored in a memory of a control unit.

11. The braking device of claim 10, wherein the control unit is at least one of integrated into the braking value encoder and formed by a brake control unit.

12. The braking device of claim 11, wherein the braking value encoder is formed by a combined electro-pneumatic foot-operated brake module.

* * * * *